(No Model.)
J. M. NASH.
UNIVERSAL JOINT.
No. 599,189. Patented Feb. 15, 1898.
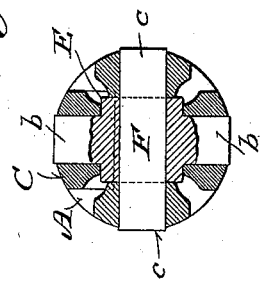
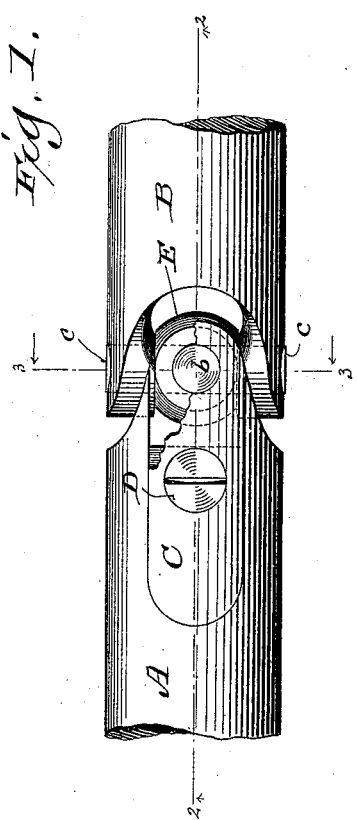
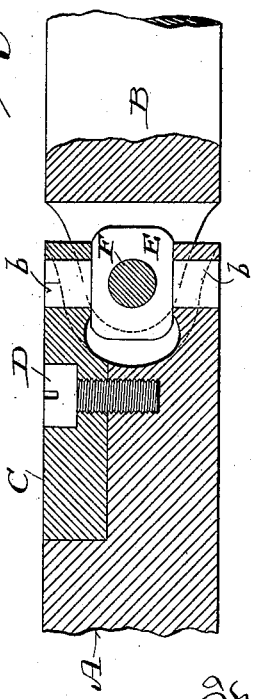
Witnesses:
Geo. W. Toney
N. E. Oliphant
Inventor:
John M. Nash.
By H. G. Underwood.
Attorneys.
THE NORRIS PETERS CO., PHOTO-LITHO., WASHINGTON, D. C.

UNITED STATES PATENT OFFICE.

JOHN M. NASH, OF MILWAUKEE, WISCONSIN.

UNIVERSAL JOINT.

SPECIFICATION forming part of Letters Patent No. 599,189, dated February 15, 1898.

Application filed May 15, 1897. Serial No. 636,633. (No model.)

*To all whom it may concern:*

Be it known that I, JOHN M. NASH, a citizen of the United States, and a resident of Milwaukee, in the county of Milwaukee and State of Wisconsin, have invented certain new and useful Improvements in Universal Joints; and I do hereby declare that the following is a full, clear, and exact description thereof.

My invention has for its object to provide a readily-separable universal joint of the gimbal variety that can be utilized in more limited space without sacrifice of strength than universal joints of common knowledge. Hence said invention consists in certain peculiarities of construction and combination of parts hereinafter specified with reference to the accompanying drawings and subsequently claimed.

Figure 1 represents an elevation of my improved universal joint partly broken; Fig. 2, a section of the joint on the plane indicated by line 2 2 in the preceding figure, and Fig. 3 a similar view on the plane indicated by line 3 3 in the first figure.

Referring by letter to the drawings, A B represent two shaft-sections in universal-joint connection. In accordance with my invention the universal joint comes within the greatest possible diameter of the shaft-sections and is readily separable, whereby economy of space is accomplished and disconnection of said shaft-sections as well as all parts of the joint made easy, these being matters of considerable importance, especially in boring-machines organized to employ a gang of flexible shafts serving as bit-stocks. It is also of importance as a feature of my invention that a readily-separable universal joint within the greatest possible diameter of the shaft-sections is obtained without sacrifice of strength.

The universal joint herein set forth is a species of the gimbal variety of such joints, and in order that it may be readily separable and come within the greatest possible diameter of the shaft-sections without sacrifice of strength depends upon the structural details hereinafter specified.

The shaft-section A is shown provided with a longitudinal mortise in which an elongated block C is fitted, the exterior of this block being flush with that of said shaft-section. While the block C is herein shown as being detachably held in place by means of a countersunk screw D run through an aperture therein and engaged with a correspondingly-tapped recess in the mortised shaft-sections, it is just as practical and may be found preferable in practice to connect said block and shaft-section by means of a pin extended through both and upset at its ends, this latter connection being more economical than the one illustrated and equally strong. It is practical to do away with the mortise by increasing the dimensions of block C and cutting away enough of the corresponding shaft-section to form a seat, but in any case said block is virtually a detachable part of the finished shaft-section to which it pertains.

The outer end of block C constitutes the greater part of one of the fork branches of shaft-section A, and loosely engaged with those fork branches are diametrically opposite pivot-arms $b$ of the cross that constitutes a member of the universal joint. The cross herein shown comprises a block E in one piece with the arms $b$, and a pin F, having engagement with an aperture in the block at right angles to the plane of said arms, so much of the pin as extends from the block E in opposite directions therefrom being the other arms $c$ of said cross and having loose engagement with the fork branches of shaft-section B aforesaid.

While the two-piece cross herein shown is the preferred construction for reasons of economy, it is obvious that a one-piece cross may be utilized, provided each of the shaft-sections has a detachable part similar to what has been set forth in the foregoing.

To separate the joint herein shown and more particularly described, it is only necessary to drive out the pin F, and in case it is desirable to remove the block E, having the arms $b$, the elongated block C is detached from the shaft-section to which it pertains. Should a one-piece cross be utilized in connection with elongated blocks C as detachable parts of the shaft-sections, it will be necessary to remove one of said blocks in order to separate the joint, and to permit taking out of the cross removal of both elongated shaft-section blocks will be necessary.

Having thus described my invention, what I claim as new, and desire to secure by Letters Patent, is—

1. In a universal joint, a four-arm cross member, a shaft-section having a fork in pivotal connection with diametrically opposite arms of the cross, and another shaft-section having a fork in pivotal engagement with the other arms of said cross, at least one arm-bearing of the series being a detachable portion of its respective shaft-section whereby a separable universal joint is had within the greatest possible diameter of said shaft-sections without sacrifice of strength.

2. In a universal joint, a cross member composed of a block in one piece with diametrically opposite arms and a pin of greater length than the block engaged with an aperture in the same on a plane at right angles to said arms, the extremities of the pin beyond the block being the other arms of the cross; a shaft-section having a fork in pivotal connection with the pin extremities and another shaft-section having a fork in pivotal connection with the arms integral with the cross-block, one arm-bearing of the latter shaft-section being a detachable block.

3. A universal joint comprising two forked shaft-sections one of which has a detachable block mortised therein, the outer end of this block constituting the greater part of a branch of the shaft-section to which it pertains; and a cross having its arms in pivotal connection with the branches of said shaft-sections.

In testimony that I claim the foregoing I have hereunto set my hand. at Milwaukee, in the county of Milwaukee and State of Wisconsin, in the presence of two witnesses.

JOHN M. NASH.

Witnesses:
N. E. OLIPHANT,
B. C. ROLOFF.